F. BATCHELOR.
FLY TRAP.
APPLICATION FILED JAN. 4, 1912.
1,042,310.
Patented Oct. 22, 1912.
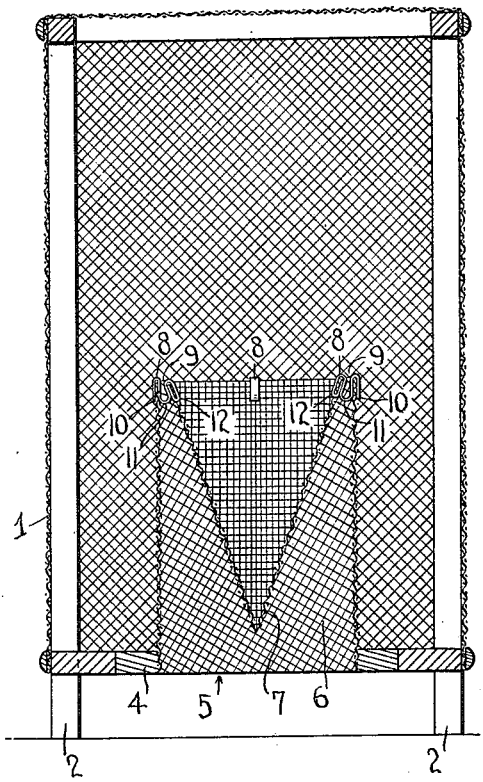
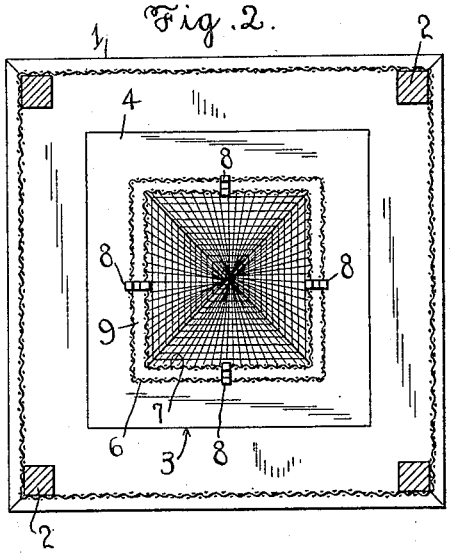
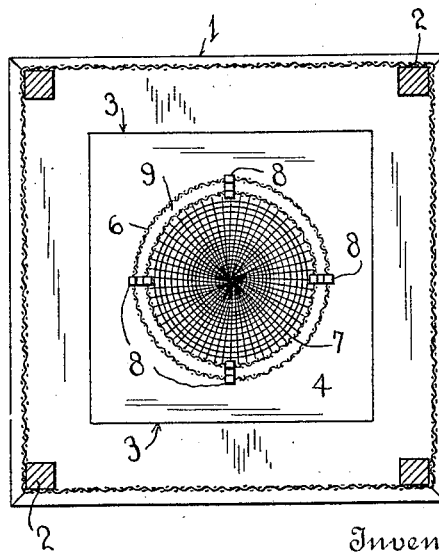
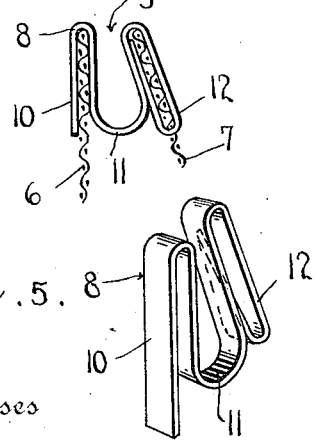
Witnesses
L. B. James
C. E. Hunt
Inventor
F. Batchelor
by H. B. Willeson &co
Attorneys

UNITED STATES PATENT OFFICE.

FREDRICK BATCHELOR, OF PERU, INDIANA, ASSIGNOR OF THREE-FOURTHS TO CLAUDE Y. ANDREWS.

FLY-TRAP.

1,042,310.

Specification of Letters Patent.   Patented Oct. 22, 1912.

Application filed January 4, 1912.   Serial No. 669,516.

*To all whom it may concern:*

Be it known that I, FREDRICK BATCHELOR, a citizen of the United States, residing at Peru, in the county of Miami and State of Indiana, have invented certain new and useful Improvements in Fly-Traps; and I do declare the following to be a full, clear, and exact description of the invention, such as will enable others skilled in the art to which it appertains to make and use the same.

This invention relates to improvements in fly traps.

One object of the invention is to provide a fly trap having an improved construction and arrangement of mechanism whereby the insects are directed toward and readily find their way into the trap, but cannot easily find their way out, and whereby the trap will be simple, strong, durable and inexpensive in construction, efficient in operation and well adapted to the purpose for which it is designed.

With this object in view the invention consists of certain novel features of construction and the combination and arrangement of parts as will be more fully described and claimed.

In the accompanying drawings; Figure 1 is a vertical section of a fly trap embodying my invention; Fig. 2 is a horizontal section of the same; Fig. 3 is a similar view of a modified form of the trap; Fig. 4 is an enlarged vertical sectional view, and Fig. 5 a detail perspective view of one of the clips which support the parts of the catching mechanism in the proper relative position.

Referring more particularly to the drawings, 1 denotes the body portion or cage of the trap of any desired size and preferably formed of wire netting supported upon a suitable frame work. The body or cage of the trap may be square, round or of any other suitable shape and is supported upon feet 2 which hold the bottom of the trap at such elevation above the surface on which the trap is supported that a sufficient space will be provided between said bottom and said surface to permit the flies or other insects to readily crawl beneath the trap.

The bottom of the trap may be of wood or metal and has therein a centrally disposed discharge opening 3 closed by a closure 4 which is held in position in any suitable manner. In the center of the closure is formed an inlet opening 5 which may be of any desired shape and to the edges of which are secured the lower edges of the walls of an inwardly extending tubular structure 6, said walls being preferably formed of wire netting. The tubular structure extends a suitable distance into the body of the trap and above the bottom thereof and has secured in its upper end a downwardly tapering structure 7 of wire netting which may be of inverted conical, pyramidal or other suitable shape. The upper end of the inverted cone or pyramid forming the tapering structure is of less diameter than the upper end of the tubular structure 6 and is attached within and to the upper end thereof by clips 8 which hold the tapering structure in a concentric position within the tubular structure 6 thus providing between the upper ends of these structures a continuous space which forms the inlet opening 9 of the trap.

The clips 8 are formed from strips of sheet metal bent at one end to form a hook 10 which is engaged over the upper edges of the walls of the tubular structure 6. The strips after being bent to form the hoops are bent to form a depending spacing loop 11 which is disposed between the adjacent upper ends of the tubular structure 6 and tapering structure 7. After forming the loops 11 the ends of the clips are bent downwardly and thence inwardly and upwardly to form hooks 12 which are engaged with and firmly secured to the upper ends of the tapering structure as shown. The hooks 12 on the inner ends of the strips are preferably tapered to a point to permit the same to be engaged with the wire netting sides of the tapering structure whereby a firm connection is obtained between the parts.

In using the trap, a suitable bait is placed beneath the inlet opening 5 in the closure 4 which will attract the flies to the opening into which, by reason of the light afforded thereby, they will fly upwardly into the tubular structure 6. On continuing upwardly the flies will come into engagement with the tapering structure 7 which will guide or direct them through the inlet opening 9 and into the body or cage of the trap from which they will not readily find their way out.

It will be observed that all of the inside mechanism of the trap is rigidly secured to the door so that by removing the door, the parts 6 and 7 will come with it and any obstructions which may have lodged in the meshes of said inner structures, or in the inner face of the main body 1 of the trap, may be readily removed. It will be further obvious that for the purpose of cleaning the structure, or for replacing the tapering structure 7 when desired, said tapering structure may be removed from the tubular structure 6 by lifting the hooks 10 of the clips 8 off the upper edge of the tubular structure. The body 1, and the inner parts 6 and 7 may now be separately washed or otherwise treated, or any of the parts replaced with others.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A fly trap comprising a frame having sides and top of wire netting and a bottom of solid material, said bottom having a central opening, legs supporting the body and bottom above their support, a closure engaging the bottom to close said opening and provided with a central opening, means for guiding flies through said opening in the closure and into the body of the trap, said guiding means comprising a tubular structure of wire netting projecting into the body of the trap and having its lower edge secured in the opening in the closure located in the tubular structure and means for securing the upper ends of the two structures together at a distance apart comprising metal clips having hooks for rigidly engaging the upper edge of the tapering structure, spacing loops, and hooks for removably engaging the upper edge of the tubular structure.

In testimony whereof I have hereunto set my hand in presence of two subscribing witnesses.

FREDRICK BATCHELOR.

Witnesses:
C. Y. ANDREWS,
J. T. COX.

---

Copies of this patent may be obtained for five cents each, by addressing the "Commissioner of Patents, Washington, D. C."